March 12, 1946.   A. D. TRENOR   2,396,478
STEERING CONTROL
Original Filed Aug. 17, 1929   7 Sheets-Sheet 1
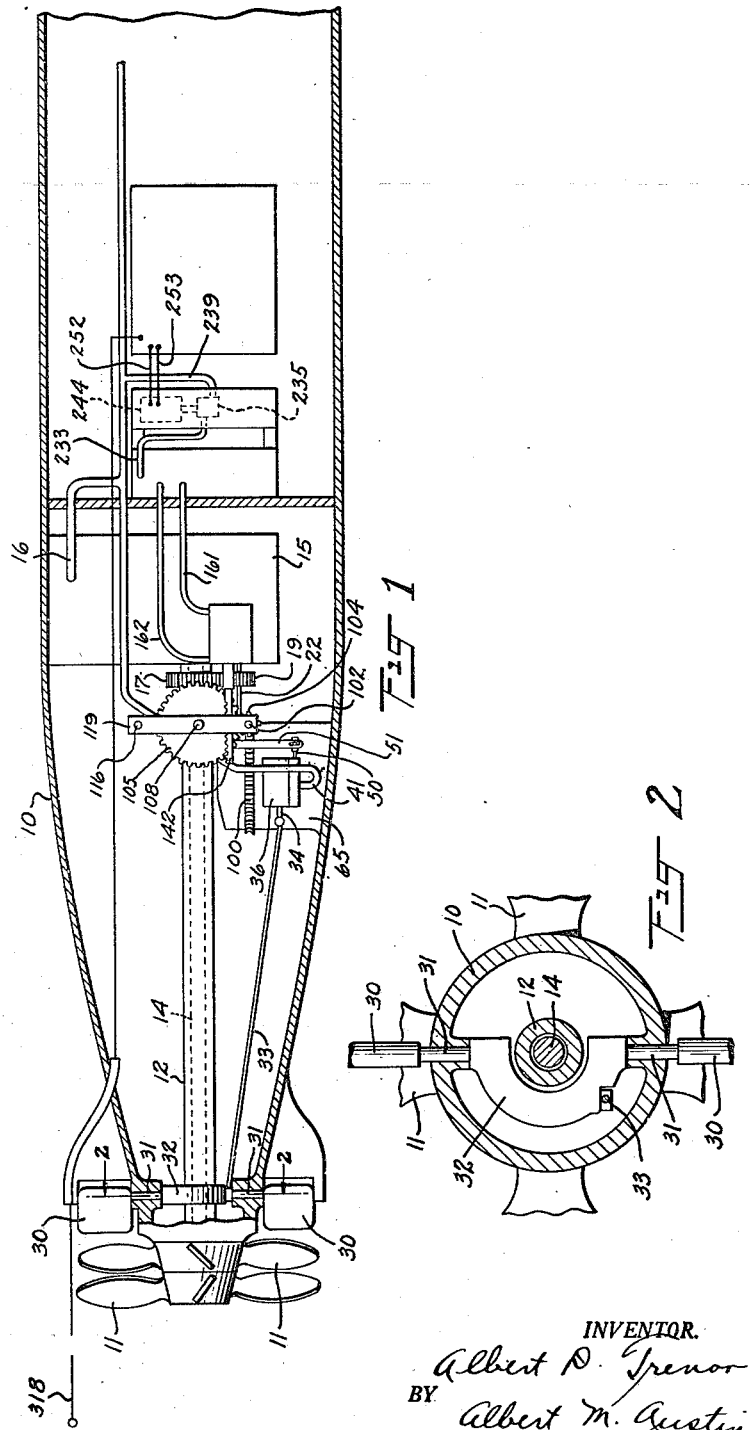

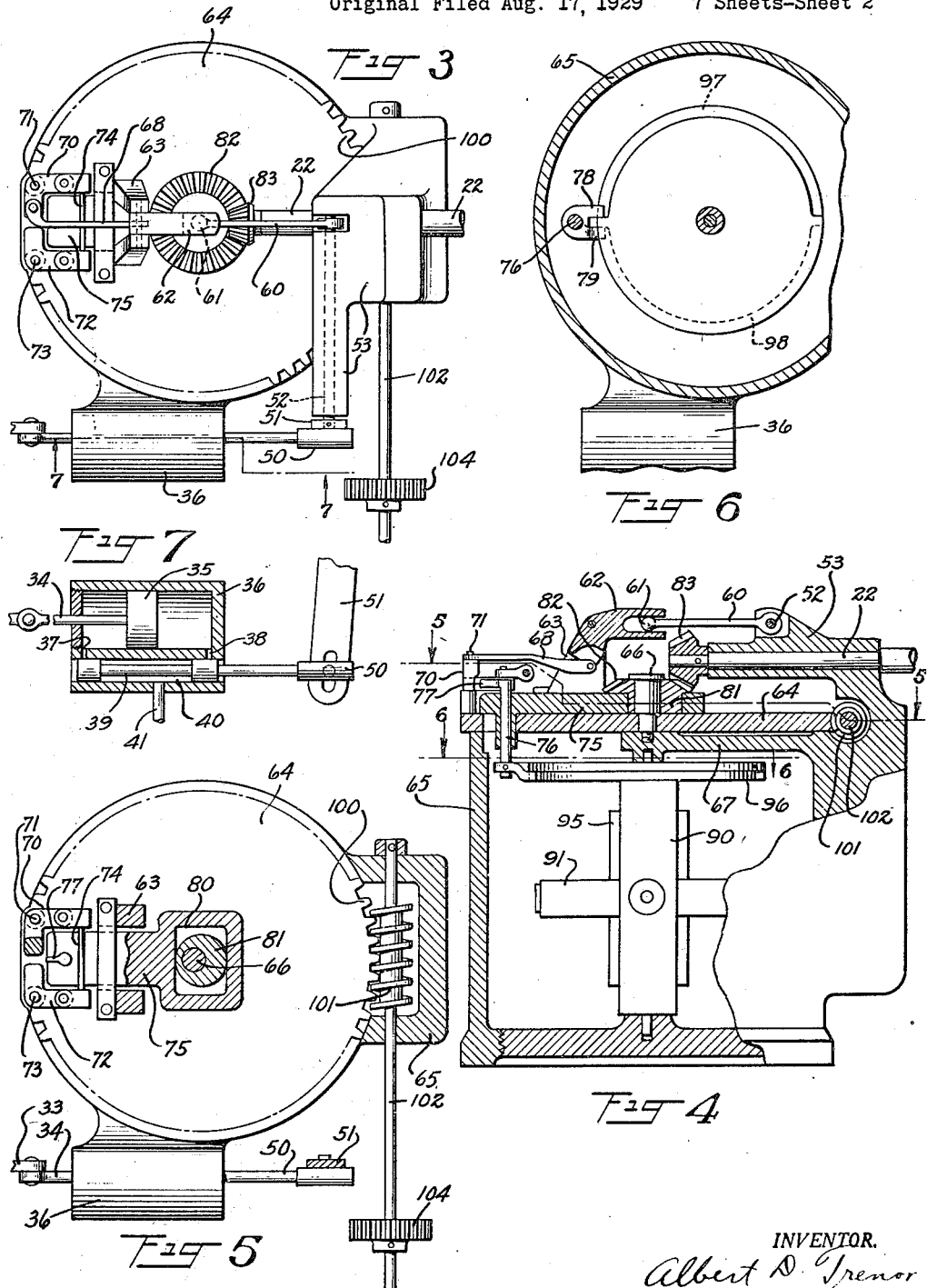

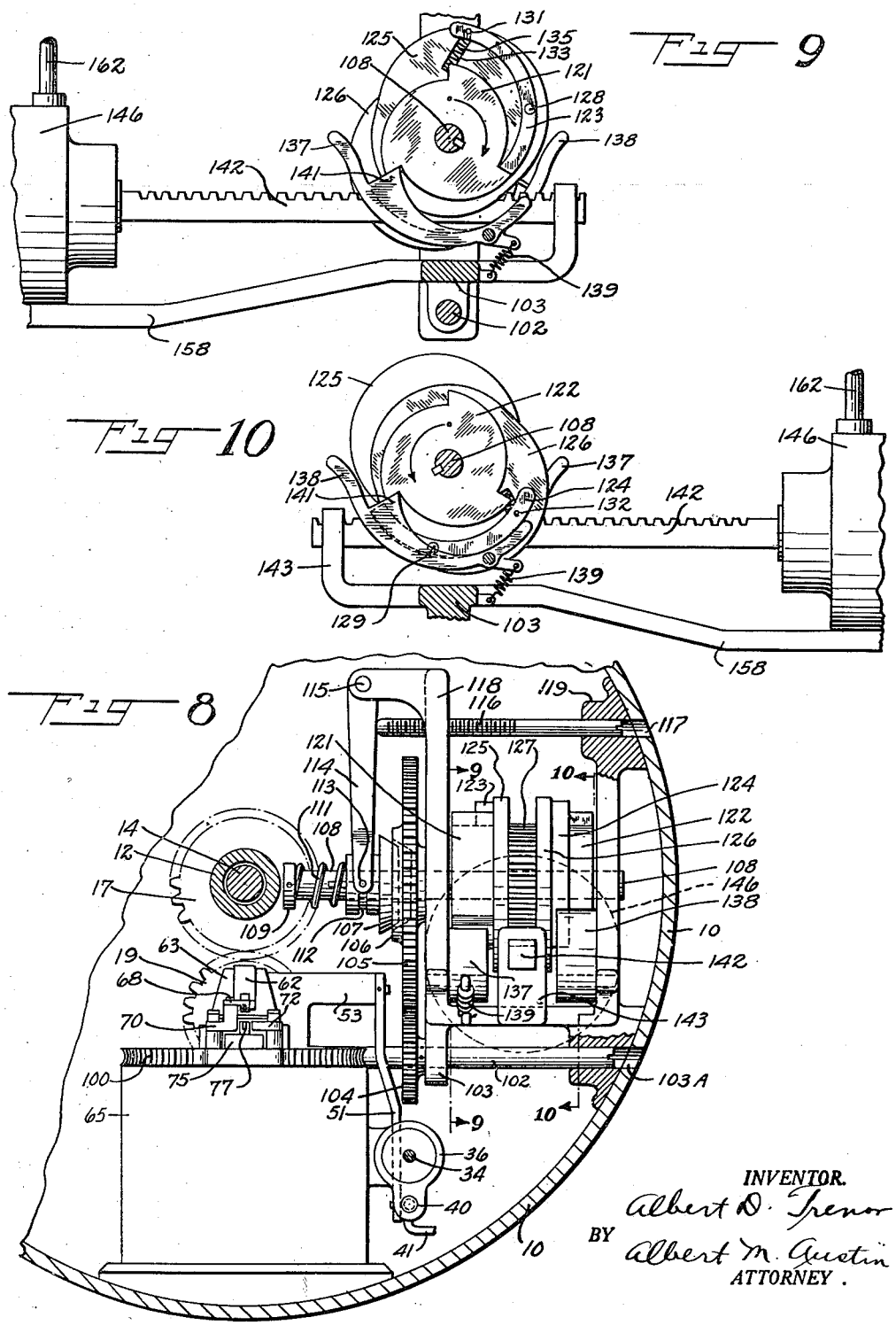

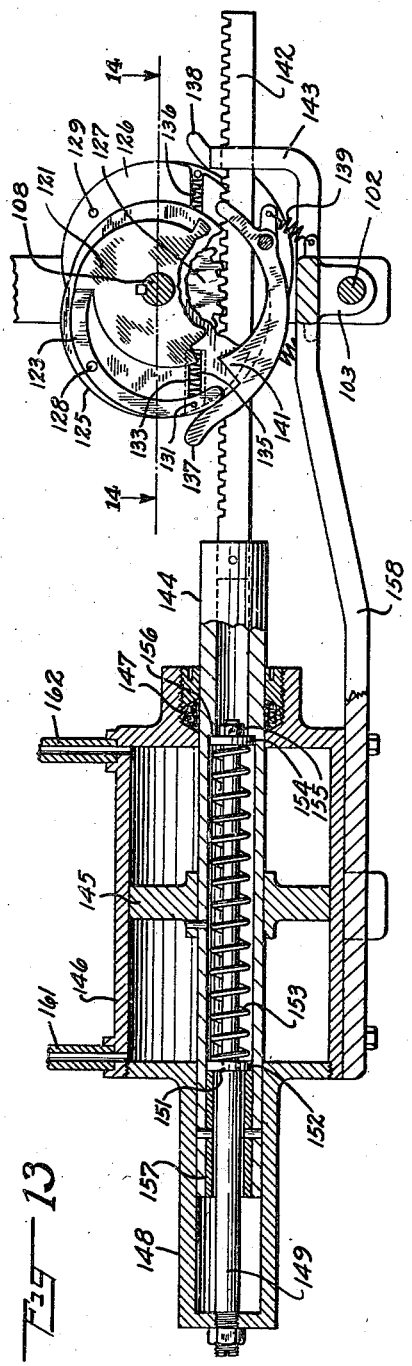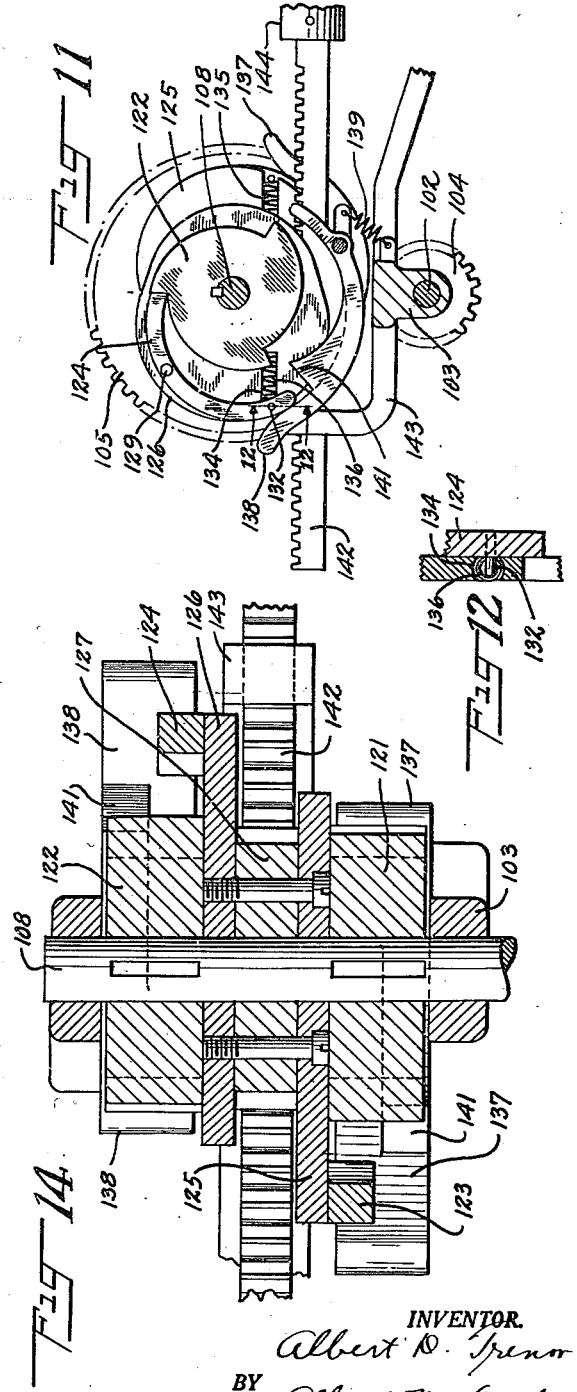

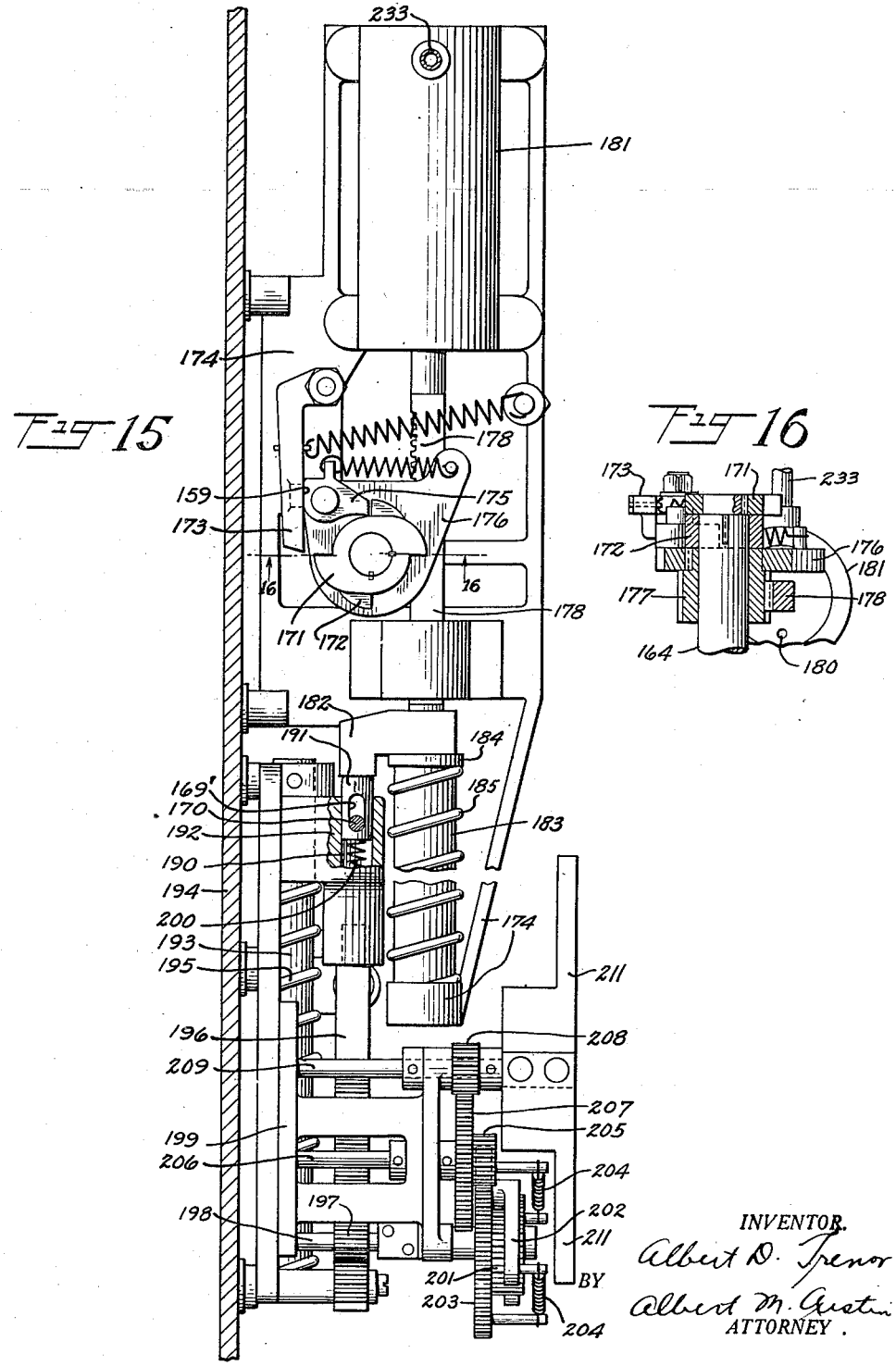

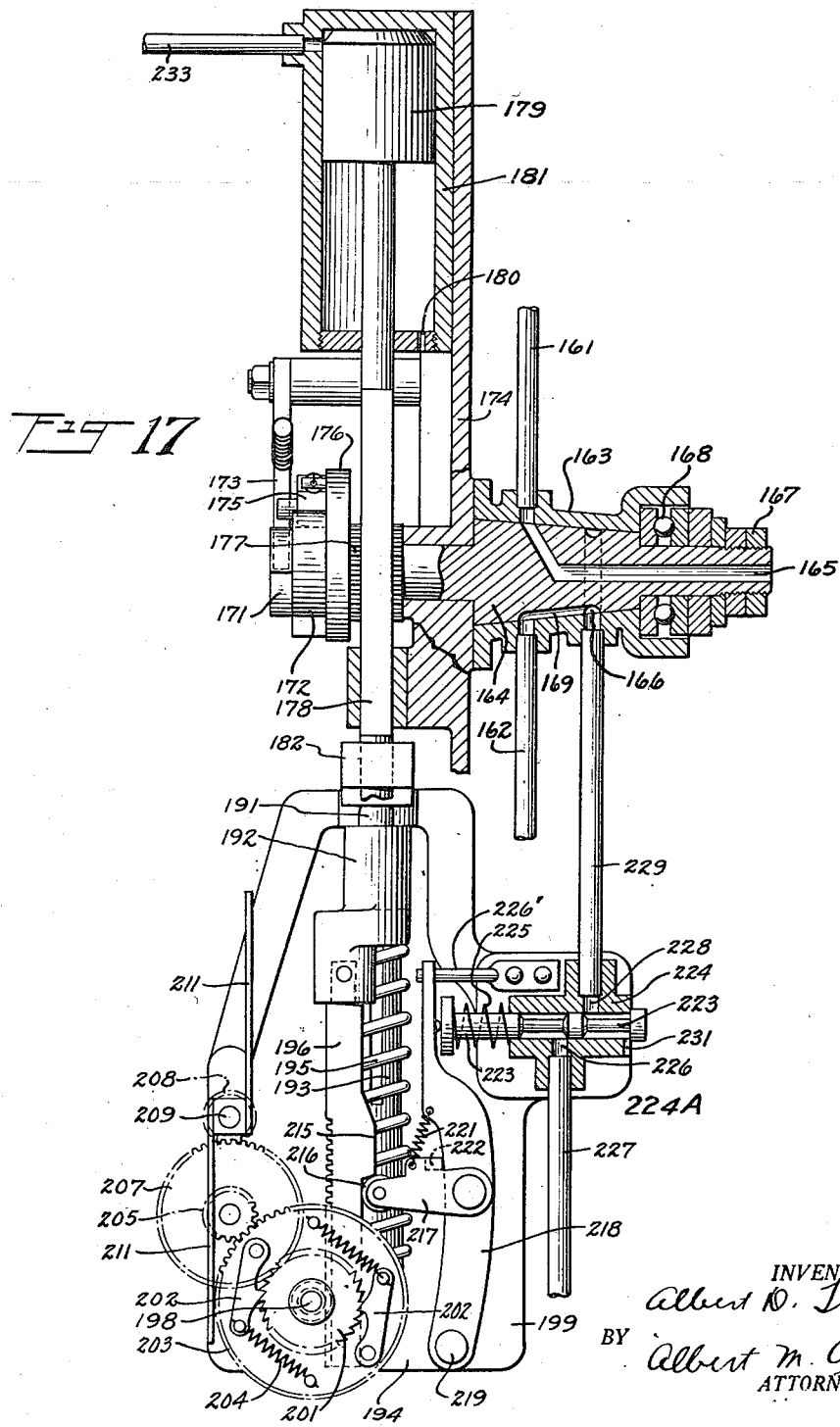

Patented Mar. 12, 1946

2,396,478

UNITED STATES PATENT OFFICE 2,396,478

STEERING CONTROL

Albert D. Trenor, Gloucester, Mass., assignor, by mesne assignments, to the United States of America as represented by the Secretary of Navy Application August 17, 1929, Serial No. 386,579
Renewed July 2, 1931

10 Claims. (Cl. 114—21)

The invention relates to the control of self-propelled moving bodies, and more particularly to a new and improved means for controlling the action of a torpedo.

The invention provides for the incorporation in a torpedo of steering means controlled from a distance for modifying the movement of the torpedo after it has been launched. This steering means is rendered operative in response to radiant impulses transmitted from a distance, and selectively effects the deviation of the torpedo to port or starboard by any predetermined number of degrees.

The invention further provides locking means associated with said steering means for locking certain elements of said steering means, whereby over running and other undesired operations thereof is prevented.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a diagrammatic sectional view of a portion of the torpedo embodying the features of the present invention.

Fig. 2 is a section taken on line 2—2 of Fig. 1.

Fig. 3 is a top plan view of the stabilizing mechanism of Fig. 1;

Fig. 4 is a side elevation, partly in section, of the stabilizing mechanism;

Fig. 5 is a sectional view taken on line 5—5 of Fig. 4;

Fig. 6 is a sectional view taken on line 6—6 of Fig. 4;

Fig. 7 is a sectional view taken on line 7—7 of Fig. 3;

Fig. 8 is a cross sectional elevation of part of the locking steering mechanism;

Fig. 9 is a longitudinal sectional elevation of the locking steering mechanism with its associated fluid pressure means in an inoperative position;

Fig. 10 is an elevation of the locking steering mechanism in the position shown in Fig. 9;

Fig 11 is a sectional view taken on line 11—11 of Fig. 8 showing the locking mechanism in an operative position;

Fig. 12 is a sectional view taken on line 12—12 of Fig. 10;

Fig. 13 is a sectional view taken on line 13—13 of Fig. 8 showing the locking mechanism in position corresponding to Fig. 11;

Fig. 14 is a sectional view taken on line 14—14 of Fig. 13;

Fig. 15 is a side elevation of the rotary valve and the delay action mechanism;

Fig. 16 is a sectional view taken on line 16—16 of Fig. 15;

Fig. 17 is a top plan view, partly in section, of the rotary valve and delay action mechanism;

Like reference characters denote like parts in the several figures of the drawings.

Figure 18:
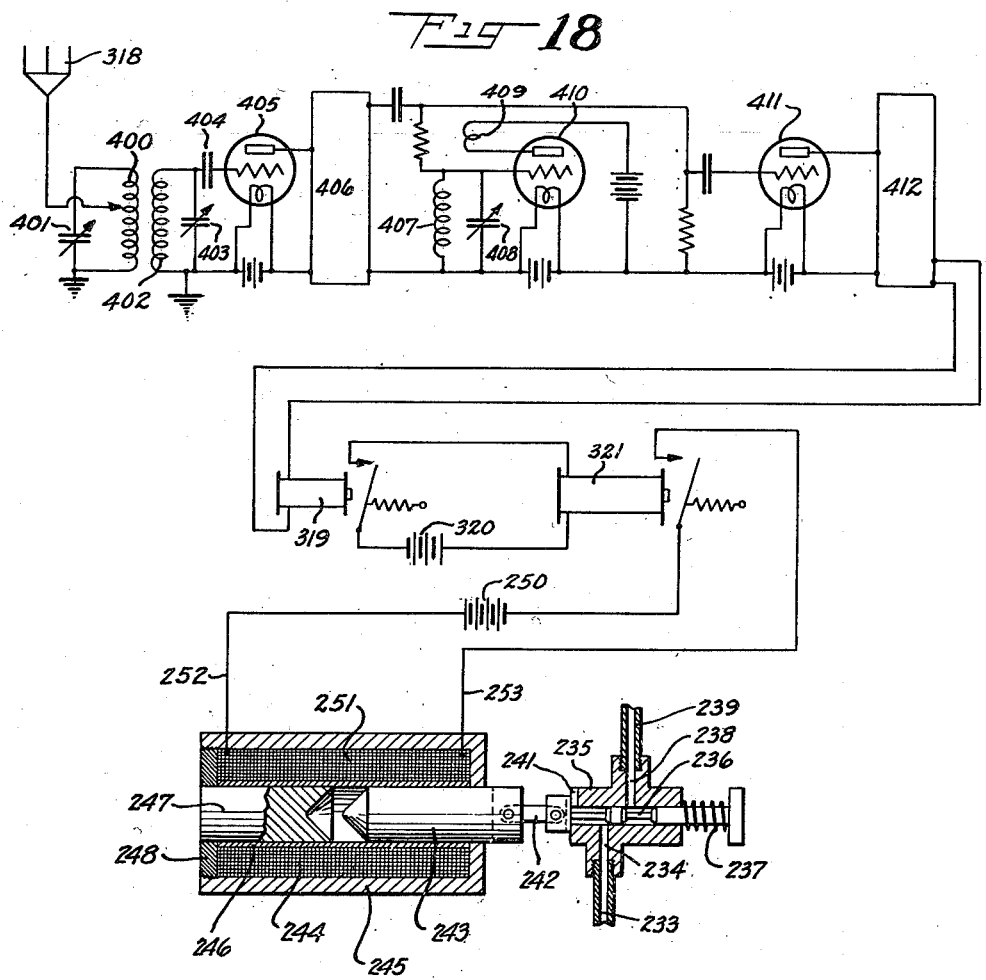
Fig. 18 is a diagrammatic illustration of the control apparatus including the radio receiving set and the electric magnetically controlled valve.

In the following description and in the claims parts will be identified by specific names for convenience, but they are intended to be as generic in their application to similar parts as the art will permit.

Referring to Fig. 1, there is shown a water borne body forming a carrier of explosives, having a water-tight torpedo hull 10, and arranged to be propelled by a pair of propellers 11, 11. The propellers 11 are mounted on a pair of concentric shafts, including an outer shaft 12, and an inner shaft 14. The shafts 12 and 14 are directly connected to a driving means 15. The driving means 15 preferably takes the form of a conventional compressed air turbine, the actuating fluid being delivered thereto through pipe 16. A gear 17 is keyed to the outer shaft 12 for operative engagement with gear 19 to cause rotation of shaft 22.

Horizontal rudders for varying the direction of movement of the torpedo about its horizontal transverse axis may also be provided in a well-known manner, but as such rudders and depth control devices for controlling the same are well known, it is thought that a more detailed description thereof is unnecessary herein.

For varying the direction of movement of the torpedo about a vertical axis so as to steer the torpedo in azimuth, there is provided a pair of blade rudders 30 pivotally mounted upon a pair of rotatable vertical rudder posts 31, whereby the rudders 30 can be moved relative to the torpedo to control the direction of movement thereof. The rudder posts 31 are shown rigidly connected by a yoke 32 (see Fig. 2) which may be shifted according to requirements by a connecting rod 33 having one end pivotally connected thereto. The other end of the connecting rod 33 is pivotally secured to a piston rod 34 of a piston 35 which is mounted for reciprocating movement in a cylinder 36. Adjacent the ends of the cylinder 36 are provided ports 37, 38, which are controlled by a slide valve 39 operating in a fluid pressure chest 40, which is in communication with a source of fluid pressure 41. The arrangement is such that the piston 35 is moved to the right or to the left according to the position of the valve 39 with respect to the ports 37, 38. The respective ports of the cylinder 36 exhaust by way of the open ends of the valve chest 40, when the valve 39 has been moved to full open position in either direction.

For actuating the slide valve 39 and also for maintaining it in position to cause the torpedo to move upon a predetermined course, two mechanisms are employed, one operating automatically under control of a stabilizing device and the other operating at the will of an operator under distant control. The parts common to the two mechanisms include an extension 50 of the slide valve 39, and having its outer end operatively connected to the free end of a rocking arm 51, the other end of which is securely fastened to a rock shaft 52 pivotally mounted in a fixed bracket 53.

As more clearly illustrated in Figs. 3 and 4, for actuating the rock shaft 51 there is provided a lever arm 60 terminating in a ball 61, which is straddled by the bifurcated end of a bell crank 62, movement of which causes the shaft 52 to rock in a desired direction. The bell crank 62 is pivotally mounted on a bracket 63 which is secured to the outer face of a rotatable cover plate 64. The cover plate 64 is mounted on a housing 65 by means of a pin 66 which is screwed into a bracket 67 of the housing 65. Pivoted to the lower arm of the bell crank 62 is a link 68, the opposite end of which is pivotally connected to an L shaped member 70 rotatably mounted upon a vertical pin 71 of the cover plate 64. A similar member 72 is pivoted to the cover plate at 73. For actuating member 72 a link 74 is provided pivotally connected to the inner ends of the members 70 and 72. Slidably mounted between the feet of the bracket 63 is a reciprocating plate 75 in which is rotatably mounted a member 76, the upper end of which is provided with a finger 77 which, when the plate 75 is reciprocated, engages either the member 70 or the member 72. The lower end of the member 76 is provided with two fingers 78 and 79, which are located in two planes, one above the other. The plate 75 is provided with a slot 80, which surrounds a cam 81, rotatably mounted on the pin 66. The upper part of the cam 81 is provided with a beveled gear 82 adapted to mesh with a second beveled gear 83 secured to the end of the shaft 22 having a bearing in the bracket 53. The shaft 22 is provided with a gear 19, which meshes with the gear 17 secured to the shaft 12.

Within the housing 65 is pivotally mounted a vertical gimbal ring 90, within which a horizontal gimbal ring 91 is mounted bearing rotating massive element 95. Secured to the vertical gimbal ring 90 is a circular plate 96 cut away on either side as at 97 and 98. The cut away portions are arranged in different horizontal planes such that the cut away portion 97 lies in the same plane as the finger 78 and the cut away portion 98 lies in the plane of the finger 79. When the torpedo is discharged, the element 95 is set in rotation by means of a driving mechanism not shown, which is automatically disconnected as the element is brought up to the desired speed. The gyroscopic action of the element 95 will tend to keep its axis in a fixed direction in space. Thus the plate 96 will always remain in its original position regardless of a change in direction of the torpedo.

For controlling the valve 39 by the above described apparatus the shaft 22 is rotated at a high speed by means of the gears 17 and 19, causing the beveled gear 83 to rotate the gear 82 and cam 81 rapidly. Rotation of the cam 81 imparts a corresponding rapid reciprocation to the plate 75, carrying with it the member 76. Thus, as the torpedo continues on a straight course, the fingers 78 and 79 will move in and out of the cut out portions 97 and 98 of the plate 96, without affecting the position of the member 76 or the finger 77, which will reciprocate between the ends of the members 70 and 72 without changing their positions. If the torpedo should deviate from a straight course, say for example to the left, the casing 65 being carried by the torpedo will be rotated in a counter-clockwise direction, thus carrying with it the member 76. As the fingers 78 and 79 are moved back and forth the finger 78 will strike the plate 96 at a part where it is not cut away, thus causing a relative rotation of the member 76 in a counter-clockwise direction, which in turn will rotate the finger 77 in a like direction. As this reciprocates it will strike the end of the member 72 rotating it in a counter-clockwise direction, which by means of the link 74 will rotate the member 70 in a like direction, thus causing the link 68 to be moved to the right, causing the bell crank 62 to be rotated in a counter-clockwise direction, thereby rotating the shaft 52 in a clockwise direction by the connection therewith of the ball 61 and arm 60. It may be readily seen that by connection of the arm 51 to the shaft 52 rotation of the shaft 52 causes movement of the arm 51, thus moving the valve 39 to the left. This will uncover the ports 37 and 38, thus allowing air to enter the left-hand side of the cylinder 36 and pass from the right hand side, causing the piston 35 to be moved to the right which, by means of the piston rod 34 and the rod 33 will cause the rudders 30 to be moved to the right, thereby restoring the torpedo to its course.

If the torpedo deviates to the right a similar action, but in the opposite direction, will take place, causing the rudders to be moved to the left. In this way, the torpedo is maintained upon a predetermined straight course under the control of the gyroscopic element 95.

For actuating the slide valve 39 at will, for example from a distant station, the cover 64 has a portion of its periphery toothed as at 100, which is in mesh with a worm 101 integrally mounted on a shaft 102, which has bearings in a frame 103, said frame being mounted on the hull of the torpedo 10. The end of the shaft 102 is slotted and may be turned by means of a screw driver or other suitable tool inserted in an opening 103A in the hull of the torpedo 10. Secured to the shaft 102 is a pinion 104 which meshes with a gear 105. Forming a part of this gear is one element of a clutch member 106. The other element of this clutch member 107 is slidably but not rotatably mounted on a shaft 108. To the end of this shaft is pinned a collar 109, between which and the clutch 107, is disposed a coil spring 111, acting to continuously urge the clutch element 107 into operative engagement with clutch element 106. The clutch member 107 is provided with a groove 112, which is engaged by two pins 113 carried by a yoke 114, which is pivoted to the frame 103 at 115. Pressing against the yoke 114 is the end of a threaded shaft 116, which is screwed into the left hand side 118 of the frame 103, but is slidably mounted in the right hand side 119 of the frame as shown in Fig. 8. An opening 117 in the hull 10 is provided, through which a screw driver or other tool may be inserted for turning the shaft 116, the end of which is slotted for this purpose.

Keyed to the shaft 108 are two ratchets 121 and 122, which face in opposite directions. Engaging the teeth of these ratchets are two pawls 123 and 124, which are pivotally mounted at 128 and 129 on two plates 125 and 126 respectively. These plates are pinned to a gear 127, which is loosely mounted on the shaft 108. The pawls 123 and 124 are provided with pins 131 and 132, which slide in slots 133 and 134 in the plate 125 and 126.

In these slots are mounted springs 135 and 136, which tend to hold the pawls in the position shown. Engaging the pawls 123 and 124 are two cams 137 and 138, which are pivoted to the frame 103. Springs 139 are provided for holding these cams in the engaged positions. These cams are provided with teeth 141, which extend over only half the width of the cam, and at suitable times engage the teeth of the ratchets 121 and 122.

Meshing with the gear 127 is a rack 142, which is slidably mounted in a bracket 143 of the frame 103. The rack 142 is pinned to the end of a tube 144, to which is secured a piston 145, which is slidably mounted in a cylinder 146. This cylinder 146 is mounted on an extension 158 of the frame 103. One end of this cylinder is provided with a stuffing box 147 and the other end with a cap 148, in which the tube 144 slides. Threaded in the end of this cap is a rod 149, which is turned down to a smaller diameter at the point 151.

Against the shoulder formed thereby is disposed a collar 152, and pressing against this collar is a coil spring 153, the other end of which presses against the second collar 154, which is prevented from sliding off the rod 149 by means of a nut 155. This collar 154 normally engages a shoulder 156 on the inside of the tube 144 formed by the reduction of the internal diameter of this tube. Pinned in the other end of the tube 144 is a sleeve 157, against which the collar 152 normally presses.

The ends of the cylinder 146 are connected to two pipes 161 and 162, which are connected to opposite sides of a rotary valve casing 163. Rotatably mounted in this casing is a direction control valve such as the rotary valve 164, which is provided with an exhaust port 165 and an inlet port 166. The rotary valve 164 is held in position by means of nuts 167 and a ball bearing 168. To the shaft of the rotary valve 164 are pinned two ratchets 171 and 172, the former cooperating with a spring pressed pawl 173 pivotally mounted on the frame 174 and the latter with a spring pressed pawl 175, mounted on a plate 176, which is secured to a gear 177 loosely mounted on the shaft of the rotary valve 164. Pawl 175 is provided with a cam surface 159, which cooperates with the pawl 173 to normally maintain said pawl 173 in disengagement from ratchet 172.

Meshing with the gear 177 is a rack 178, to one end of which is secured a piston 179 slidably mounted in a cylinder 181. To the other end of the rack 178 is pinned a dog 182 and a tube 183, and mounted therebetween is a collar 184. Loosely mounted on the tube 183 and between the collar 184 and the frame 174, is a coil spring 185.

Engaging the dog 182 is a plunger 191 slidably mounted in the bore 190 of the member 192, which in turn is slidably mounted on a rod 193, secured to the frame 194. The plunger 191 is provided with a slot 169' which engages a guide pin 170 secured to said member 192. In the base of said bore 190 is disposed a spring 200 which abuts the end of the plunger 191. Loosely mounted on the rod 193 between the member 192 and the frame 194 is a coil spring 195. Mounted in the member 192 is a rack 196, which meshes with a pinion 197, secured to a shaft 198 which is rotatably mounted in a secondary frame 199. Pinned to the shaft 198 is a ratchet 201, which engages two pawls 202, pivotally mounted on a gear 203, which is loosely mounted on the shaft 198. Springs 204 tend to hold the pawl 202 in engagement with the ratchet 201. Meshing with the gear 203 is a pinion 205, secured to a shaft 206, which is rotatably mounted in the secondary frame 199. Secured to the shaft 206 is a gear 207, which meshes with a pinion 208, secured to a shaft 209 mounted for rotation in the secondary frame 199. Secured to the upper end of the shaft 209 are two vanes 211.

The rack 196 is provided with a cam surface 215, which is engaged by a roller 216 rotatably mounted in the end of an arm 217, which is pivotally mounted on a second arm 218, which is pivoted at 219 to the frame 194. A spring 221 tends to rotate the arm 217 in a clock-wise direction. This motion is prevented, however, by a dog 222 integral with the arm 217 and abutting the underside of the arm 218 (Fig. 17). Engaging the end of the arm 218 is a valve stem 223, which is slidably mounted in a valve casing 224 on an impulse control valve 224A. A spring 225 holds the valve stem in the position shown, and a bracket 226' is mounted on the frame 194, and slides in a groove in the arm 218 so as to keep it in alignment with the valve stem 223. The valve casing 224 is provided with an inlet port 226 connected to a supply pipe 227, and an outlet port 228 connected to a pipe 229, which is always in communication with an annular groove 166 of the rotary valve 164 and which sometimes is in communication with the longitudinal groove 169. An exhaust port 231 is provided at the end of the valve casing 224.

One end of the cylinder 181 is provided with a vent opening 180 and communicating with the other end is a pipe 233, which is connected to the outlet port 234 of a relay valve casing 235. Slidably mounted in this casing is a valve stem 236, which is held in the position shown in Fig. 18 by means of a spring 237. In the valve casing 235 is an inlet port 238 connected to a supply pipe 239. Exhaust port 241 is provided at one end of the valve casing 235. One end of the valve stem 236 is connected by a link 242 to a core 243 of a solenoid 244, the casing 245 of which is made of magnetic material such as soft iron. The core 243 slides in a tube 246 of a nonmagnetic material such as brass, in the other end of which is mounted a fixed core 247 of magnetic material.

An annular piece 248 of magnetic material, connects the casing 245 with the core 247. Wound on the tube 246 is a winding 251, the two ends of which are connected to conductors 252 and 253.

For receiving radiant energy to operate the solenoid 251 there is provided an insulated antenna 318, arranged to trail after the torpedo during its movement through the water, the outer end being insulated to prevent grounding. The torpedo end of the antenna is connected to a tapped inductance 400, one terminal of which is grounded to the hull 10 of the torpedo. The other terminal of the inductance is connected through a variable condenser 401 to ground, thus forming an open oscillatory circuit, which may be readily tuned by adjustment of the condenser to the frequency of energy, which is to be received. The inductance is inductively coupled to a secondary winding 402, which is shunted by a variable condenser 403, and forms in combination therewith a secondary, closed oscillatory circuit, which may be similarly tuned to the frequency of the received energy by adjustment of the condenser. The secondary circuit is connected through a blocking condenser 404 to a three electrode thermionic device 405, preferably in the form of a so called vacuum tube having an evacuated container, a cathode, shown in the form of a heated filament, for emitting electrons, a grid for controlling the passage of electrons and a plate upon which the electrons impinge. The plate or output circuit includes an amplifier 406 for amplifying the energy impressed thereon by the vacuum tube.

The vacuum tube thus serves as a detector of received energy which may take the form of complex radiant energy of high frequency, having impressed thereon intermediate amplitude variations modulated in accordance with a signal. The modulated intermediate frequency thus appears in the output circuit of the rectifying tube and is amplified by the amplifier. The intermediate frequency is impressed upon an inductance 407, having in shunt therewith a variable condenser 408, the inductance and condenser forming in combination a closed oscillatory circuit which may be tuned to the intermediate frequency by adjustment of the variable condensers. The inductance is coupled to a tickler coil 409, which is included in the plate circuit of a vacuum tube oscillator 410, the input of which is connected to the inductance. The vacuum tube thus serves as a generator of the intermediate frequency which is combined with the modulated intermediate frequency in a second detector 411 to produce a low frequency current corresponding to the original modulating current. The output circuit of detector 411 includes an amplifier 412, the output of which is connected to the winding of a sensitive relay 319, whose contact controls a local circuit including a source of energy 320, and the winding of a secondary relay 321. The contacts of the secondary relay 321 are included in a circuit having connected in series therewith a source of energy, such as a battery 250. It will thus be seen that when energy of predetermined characteristic is impressed upon the antenna 318 it is amplified and detected and serves to operate the relay 319; and that the consequent operation of the relay 319 causes the operation of the secondary relay 321 which in turn causes the energization of solenoid 244.

In the operation in the form of the invention shown in the accompanying figures, before the torpedo is fired, if it is desired to make an angle shot, a tool is inserted in the opening 103A and the shaft 102 is rotated a predetermined number of revolutions, which is determined by the angle through which it is desired to have the torpedo turned immediately after firing. The rotation of this shaft causes a rotation of the worm 101, which in turn rotates the top plate 64 through the desired angle, but in the opposite direction in which it is desired to turn the torpedo. The tool is then inserted in the opening 117 and the shaft 116 is rotated so as to allow the yoke 114 to swing to the right, which permits the engagement of the clutch members 107 and 106 under the action of the spring 111.

Just before being discharged, the usual firing pin (not shown) is released so as to permit explosion of the charge when the torpedo strikes the target. The various electrical circuits shown diagrammatically in the drawings are also closed by means of a conventional switch connected in series therewith but omitted from the drawings for the sake of simplicity, and the source of supply of fluid medium 16 is turned on. The torpedo is thereupon discharged from its tube and, the driving means 15 actuated to rotate the shafts 12, 14 and the propellers 11, 11. After turning through the desired angle in a manner already described in connection with the stabilizing means, the torpedo proceeds upon a straight course toward the enemy.

If it is seen that this course will not intersect the enemy's course at the proper point to insure a hit, a suitable impulse of radiant energy is sent from a distant station. The radiant energy excites the antenna 318 which trails behind the torpedo. The signals are thus transmitted to a receiving circuit as illustrated in Fig. 18 in which they are detected and amplified. The amplified signal energy actuates the relay 319, which in turn closes the circuit including the battery 320, armature and front contact of the relay 319 and the winding of the secondary relay 321, thus causing the actuation of the relay 321. A circuit is then closed from one pole of the battery 322, armature and front contact of the secondary relay 321, the conductors 252 and 253, and the winding 251 thus energizing the solenoid 244. This causes a movement of the core 243 to the left, which in turn moves the valve stem 236 to the left, allowing air to enter from the supply pipe 239 to the outlet pipe 233. This air then passes to the cylinder 181, causing the piston 179 to be actuated downwardly. The rack 178 is thereby moved downwardly thus rotating the gear 177 through half a revolution in a clockwise direction, as shown in Fig. 15. This effects a similar corresponding rotational movement of the plate 176 together with the pawl 175, which turns the ratchet 172 through a half a revolution, thus rotating the rotary valve 164 into the position shown in Fig. 17. As the shaft of the rotary valve turns through half a revolution the ratchet 171 will be engaged by the pawl 173, which has moved up into the path of this ratchet while the pawl 175 was rotating, thus stopping the rotation of the rotary valve after it has made exactly half a revolution. At the same time, the dog 182 engages plunger 191 thereby causing a movement of the member 192 downwardly against the action of the spring 195 (Figs. 15 and 17).

This motion is very rapid and as the ratchet 201 is turned in a clockwise direction (Fig. 17) the pawls 202 slip idly over the teeth of the ratchet. As the rack 196 moves downwardly, the roller 216 rides over the cam surface 215, causing the arm 217 to be rotated about its pivot in a counterclockwise direction (Fig. 17) against the action of the spring 221. The spring 225 under these conditions is sufficiently strong to prevent any change in the position of the secondary arm 218. Upon the cessation of the wireless impulse, the solenoid 244 is de-energized, thereby allowing the valve stem 236 to be restored to its normal position under the action of the spring 237. This cuts off the supply of air to the pipe 233, and connects it to the exhaust port 241, thus allowing air to be exhausted from the cylinder 181, and allowing the piston 179 to return upwardly under the action of the spring 185. This restores the plate 176 and the pawl 175 to the position shown in Fig. 15. At the same time, the dog 182 has moved upwardly, thus allowing the member 192, under the action of the spring 195, to be moved upwardly, drawing with it, the rack 196 which on this return motion rotates the pinion 197 and the shaft 198 and the ratchet 201 in a counter-clockwise direction (Fig. 17), thereby causing the pawl 202 to engage the teeth of the ratchet 201. This effects the rotation of the gear 203, which rotates the pinion 205 and the gear 207. This in turn rotates the pinion 208 and the vanes 211, thereby forming a wind damping arrangement, which causes the member 192 to proceed slowly upwardly, the speed depending upon the gear ratios and the size of the vanes 211. As the rack 196 moves slowly upwardly, the roller 216 rides upon the cam surface 215, but the arm 217 cannot rotate in a clockwise direction owing to the abutment of lug 222 against the under-side of the arm 218. The arm 217 moves to the right, therefore, thereby causing the rotation of the secondary arm 218 about its pivot point 219. The motion of this arm is transmitted to the valve stem 223, which connects the supply pipe 227 to the outlet pipe 229, thus allowing air to enter this pipe, pass through the groove 166 to the pipe 162, thence to the right hand side of the cylinder 146 (Fig. 9). This causes the piston 145 to be moved to the left, while the air on the left hand side of the piston is being exhausted through the pipe 161 and the exhaust port 165 of the rotary valve 146. As the piston moves to the left, it will draw the tube 144 to the left, which in turn will carry with it the collar 154, thus compressing the spring 153. At the same time, the rack 142 will be moved to the left, thus rotating the gear 127 in clock-wise direction (Fig. 9) through a third of a revolution, which in turn will move the plate 125 with the pawl 123 and the ratchet 121 through a third of a revolution from the position shown in Fig. 9, to the position shown in Fig. 11. It will be noted that when the end of the pawl 123 moves out of engagement with the cam 137, this cam will rotate in a clock-wise direction (Fig. 11) under the control of the spring 139 and the tooth 141 will drop into engagement with the next tooth of the ratchet 121. At the same time the pawl 124 from its original position shown in Fig. 10 will slide along the surface of the cam 138, which is so shaped that when the pawl is in its extreme position as shown in Fig. 13 the tooth 141 will move into engagement with the teeth of ratchet 122 thereby locking the ratchet 122 against further rotational movement in the direction indicated in Figs. 11 and 13. By this means the over running of the ratchets 121 and 122 will be avoided and the shaft 108 together with the gear 105 will be rotated through exactly a third of a revolution, which will cause the gear 104 to make exactly one complete revolution, this in turn rotating the shaft 102 and the worm 101, which causes the plate 64 to be rotated through a precise predetermined angle in a clockwise direction, as seen in Figs. 3 and 5, usually five degrees. The cover 64 in its movement carries the member 76 with it so that it is shifted relatively to the plate 96 in a clockwise direction. The operation is then the same as previously described for the automatic control, namely; the valve rod is shifted to admit fluid under pressure to the right hand end of the cylinder 36 thus causing the piston 35 to move and shift the rudder 30 in a clockwise direction so that the torpedo is directed towards the left, until it has moved through the same number of degrees that the cover 64 has been moved. When it has reached this position, the member 76 has come into a neutral position with respect to the plate 96, and the torpedo will then proceed upon the new course as required.

As the rack 196 continues to move to the left, the roller 216 will eventually drop off the cam surface 215, and the secondary arm 218 together with the valve stem 223 will be moved into their initial position under the action of the spring 225, thus shutting off the supply of air from the pipe 229, and connecting it to the exhaust port 231. This will allow air to exhaust from right hand side of the cylinder 146, through the pipe 162, groove 166, pipe 229 and port 231. The spring 153 will then move the tube 144 together with the piston 145 to the right, until the collar 154 engages the nut 155 which will move the rack 142 to the right, turning the gear 127 through a third of a revolution in a counter-clockwise direction, thus moving the plate 125 and the pawl 123 back into its initial position, as shown in Fig. 9. As this takes place the tooth 141 of the pawl 137 will prevent the ratchet 121 from being rotated in a counter clockwise direction. At the end of this motion when the pawl 123 drops over the top tooth of the ratchet 121 the end of the pawl 123 will engage the cam 137, moving the tooth 141 out of engagement with the ratchet 121. The strength of the springs 133 and 139 are so adjusted that this action will take place. At the same time the plate 126 and the pawl 124 will be returned to their initial positions as shown in Fig. 10. As this takes place the end of the pawl 124 will engage the cam 138 moving the tooth 141 out of engagement with the ratchet 122.

If it had been desired after the first impulse had been sent to turn the torpedo through an additional five degrees to the left, two short impulses would be sent causing the rotary valve 164 to be turned through two half revolutions or one complete revolution into the same position as shown in Fig. 17. This complete revolution will have been accomplished before the valve 224 could have opened, as the opening of this valve is delayed by the damping mechanism already described. This will allow the operator time to turn the rotary valve through a complete revolution before air is allowed to enter pipe 229. After the cessation of the second of these two short impulses, the valve 224 will be opened for a brief interval, allowing air to pass into the pipe 229, through groove 166, along groove 169, through pipe 162, to the right hand side of cylinder 146. This, as already described will cause the torpedo to be turned through an additional five degrees to the left.

If it had originally been desired to direct the torpedo to the right instead of the left, the general sequence in the operation would be the same, excepting that two short impulses would have been transmitted from the sending station instead of the one impulses as already described. This would cause the rotary valve 164 to be turned through two half revolutions or one complete revolution from the original position into a position in which the longitudinal groove 169 will be in communication with pipe 161. At the same time the delay action will function as previously described, causing the valve 224 to be opened for a brief interval of time, during which air will pass from the supply 227, to the pipe 229, through the annular groove 166 into the longitudinal groove 169 then to the pipe 161, and thence into the left hand side of cylinder 146. This will cause the piston to be moved to the right, drawing the collar 152 with it and compressing the spring 153.

This causes the rack 142 to be moved to the right, thus rotating the gear 127 and the two plates 125 and 126 through a third of a revolution in a counter-clockwise direction. During this movement, the pawl 123 slides along the surface of the cam 137, which will cause the tooth 141, to drop into the path of the ratchet 121, thus preventing the same from turning through more than a third of a revolution. In this way, it is seen that the teeth 141 on the two pawls 137 and 138 form stop pawls when the ratchets are turned in one direction, and form click pawls when the ratchets are turned in the opposite direction, thus forming an interlocking system which prevents the over running of the ratchets or their being carried backward on the return stroke. The rotational movement of the plate 125 and 126 being transmitted to the shaft 108 will turn the shaft 102 through one complete revolution in a clockwise direction, thus causing the torpedo's course to be shifted five degrees to the right. It will be apparent that by suitably selecting the gears through which this motion is transmitted, the course of the torpedo can be shifted to port or to starboard any predetermined number of degrees as a result of the transmission of a radiant energy signal. It has been found desirable, however, to provide gear mechanisms, such, that the course of the torpedo is shifted through an angular distance of five degrees in response to each impulse.

It is obvious that the torpedo may subsequently be changed as many times as may be desired by the transmission of one short impulse or two short impulses in order to position the rotary valve 164 into required position. For instance, if the course of the torpedo has been shifted to left and it is desired that the next deviation of the course be to right it is only necessary to transmit a single additional impulse.

It is to be noted that by means of the present invention an efficient steering device responsive to remote control has been provided which selectively modifies the movement of the torpedo after it has been launched. It should also be noted that by associating locking means with said steering device the possibility of the steering elements over running their required operation is obviated, thereby enabling the operator at the distant station to more accurately control the course of the torpedo.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a self-propelled body, steering means responsive to remote control, said steering means comprising a direction control member, a first means operatively associated with said control member for selectively positioning said member, receiving means responsive to remote control for initiating the operation of the said first means, locking means associated with said first means for locking said control member in selected position, and means operable in accordance with the position of said control member for controlling the course of said body.

2. In a torpedo, stabilizing means for normally maintaining said torpedo upon a pre-selected course, steering means for altering the course of said torpedo, said steering means comprising a direction control member, a first means operatively associated with said control member for selectively positioning said control member, locking means associated with said first means for locking said control member against displacement beyond a predetermined amount, and means operable in accordance with the position of said direction control member for modifying the position of those elements of said stabilizing device whereby the course of the torpedo is altered.

3. In a self-propelled body, means for normally maintaining said body upon a pre-selected course, and steering means for selectively altering the course of said body, said steering means comprising a direction control member, a first means for selectively positioning said control member, means operable in accordance with the position of said direction control member for modifying the position of the steering elements of the body, and locking means associated with the last mentioned means for limiting the operation of the steering means to those actuations necessary to produce an exact pre-determined deviation of the body.

4. In a self-propelled body, steering means responsive to remote control, said steering means comprising a direction control member, a first means operatively associated with said control member for selectively positioning said member, receiving means responsive to remote control for initiating the operation of the said first means, means operable in accordance with the position of said direction control member for modifying the position of the steering elements of the body, and locking means associated with the last mentioned means for limiting the operation of the steering means to those actuations necessary to produce an exact predetermined deviation of the body.

5. In combination with a self-propelled body means for normally maintaining said body upon a pre-selected course and steering means responsive to remote control for selectively altering the course of said body, said steering means comprising a direction control valve, a first fluid pressure means for selectively positioning said valve, means responsive to remote control for initiating the operation of said first fluid pressure means, a fluid impulse control valve associated with said direction control valve, a second fluid pressure means initiated in response to the actuation of said impulse control valve and operable in accordance with the position of said direction control valve for modifying the position of the steering elements of the body, and delay means for suspending the actuation of said impulse control valve a predetermined time after the positioning of said direction control valve is initiated.

6. In a moving body, means for normally maintaining said body upon a predetermined course, steering means responsive to remote control for selectively altering said course by predetermined amounts, suitable mechanism associated with said steering means for preventing operation thereof beyond said predetermined amount, and locking means associated with said steering means for preventing movement thereof during resetting of said remote control means.

7. In a moving body, a steering means, a direction control valve adapted to control the operation of said steering means, means for moving said direction control valve into a predetermined position, a member operable in response to movement of said control valve and biased to return to its original position, means for retarding the return of said member comprising a fan driven by the return movement of said member and means rendered operable when said member approaches its original postiion for completing a control circuit through said valve and thereby operating said steering device.

8. In a moving body, a steering device, a direction control valve for controlling the operation thereof, a movable cam operable in one direction in response to movement of said valve and biased to return to its original position, means for retarding the return movement of said cam and means controlled by said cam for completing a working circuit through said valve when said cam approaches its original position whereby said steering device is actuated to steer said body in accordance with the setting of said valve.

9. In a moving body, a steering device therefor, a direction control valve for controlling the operation of said steering device, means for periodically completing a circuit through said valve, a delay mechanism comprising a cam movable in one direction in response to movement of said valve and biased to return to its original position, and a fan operable in response to return movement of said cam, said fan operating to retard said return movement.

10. In a moving body, a steering mechanism, a direction control valve for controlling the operation of said steering mechanism, means responsive to a control impulse for positioning said valve, means to prevent overrunning of said valve whereby the desired position is assured and means for locking said valve to prevent further movement until the next control impulse is received.

ALBERT D. TRENOR.